Patented Feb. 9, 1954

2,668,860

UNITED STATES PATENT OFFICE 2,668,860

PROCESS FOR PREPARING ARYLOXY-METHYL HALIDES

Harry James Barber, Gidea Park, England, assignor to May & Baker Limited, Dagenham, England No Drawing. Application August 29, 1949, Serial No. 113,030

10 Claims. (Cl. 260—612)

This invention concerns new organic halides and processes of producing the same.

It is an object of this invention to provide new organic halides which have application as intermediates in organic syntheses and specifically in the preparation of compounds which contain a methylene group linked by an oxygen or a sulphur atom to a substituted or unsubstituted aromatic nucleus.

The new organic halides of the present invention are aryloxymethyl and arylthiomethyl halides having the constitution $R(XCH_2Y)_n$ where X represents an oxygen or sulphur atom, Y represents a halogen atom, for example a chlorine or bromine atom, $n$ is an integer not greater than 3 and R represents a substituted or unsubstituted aryl radical or, when X represents a sulphur atom and $n=1$, also an aralkyl radical. These new compounds have not hitherto been described in the chemical literature. Attempts have been made from time to time to prepare compounds of this type by reacting, for example, methylene chloride with sodium phenoxide according to the equation:

$$C_6H_5.O.Na + CH_2Cl_2 = C_6H_5.O.CH_2Cl + NaCl$$

but only diphenoxymethane and unreacted methylene chloride was obtained. Similarly, attemps to break down diphenoxymethane with one molecular proportion of hydrogen bromide according to the equation:

$$C_6H_5.O.CH_2.O.C_6H_5 + HBr =$$
$$C_6H_5.O.CH_2Br + C_6H_5OH$$

have failed. The state of knowledge concerning these attempts is reviewed by Kirner (J. Amer. Chem. Soc., 1926, 48, 2747). Attempts have also been made (Weygand, Zentralblatt, 1941, II, 3053) to chlorinate anisole in the omega position thus:

$$C_6H_5.O.CH_3 + Cl_2 = C_6H_5.O.CH_2Cl + HCl$$

but a complex mixture of reaction products ensued and fractionation yielded products of doubtful identity. In any case it is clear that such drastic methods as high temperature vapour phase halogenation would have a limited application and could not readily yield pure products of assured identity.

In the specification of co-pending application Ser. No. 113,029, filed August 29, 1949, now abandoned, there are described processes for producing aryloxy- and arylthiomethane sulphonic acids of the general formula $R(X.CH_2.SO_3H)_n$ and their derivatives, a class of sulphonates not hitherto known.

According to a feature of the present invention it has now been found that if these sulphonic acids or their salts are treated with phosphorus pentachloride, pentabromide, oxychloride or oxybromide or thionyl chloride or bromide, in the presence or absence of an inert diluent, the corresponding substituted methyl halide results smoothly and in good yield.

The reaction (using, for example, phosphorus pentachloride and an aryloxymethane mono sulphonic acid or salt thereof) may be represented as follows:

$$R.O.CH_2SO_3M + 2PCl_5 =$$
$$R.O.CH_2Cl + SOCl_2 + 2POCl_3 + MCl$$

It is presumed that the reaction involves the formation of the sulphonyl halide as a result of the well known reaction between a phosphorus pentahalide and a sulphonate and that the sulphonyl halide then breaks down losing sulphur dioxide which interacts with a second molecule of phosphorus pentahalide to give thionyl halide and phosphorus oxyhalide.

The invention, however, includes within its scope any variations of the above process in which an intermediate reaction product, for example the sulphonyl halide, may be isolated at any stage and then decomposed, for example by simple thermal decomposition. Thus, for example:

$$R.O.CH_2.SO_2Y = R.O.CH_2.Y + SO_2$$

As already indicated, the process may be carried out without diluent or an inert diluent may be used if required. By "an inert diluent" is meant one which will not react with phosphorus pentahalide or the products of reaction under the conditions obtaining.

It will be obvious that should the radical R contain any other functional groups, which per se will react with phosphorus pentahalide, the products arising from such additional reaction must not interfere with the main reaction. Provided they do not interfere, any known reaction such as conversion of R.COOH to R.COCl may be carried out simultaneously. It will also be obvious that if more than one $—X.CH_2SO_3M$ group is present then the corresponding number of $—X.CH_2Y$ groups will be formed by use of the corresponding proportion of phosphorus halide.

The compounds of this new class (especially those of the foregoing general formula in which X represents an oxygen atom and $n=1$) provide a wide range of possibilities for further new types of compound.

The thiocyanates may be formed from the chlorides or bromides hereinbefore described by metathesis.

Compounds of the new class in which $n=1$, especially those substituted in the aromatic nucleus by a chlorine atom, preferably in the 4 position with or without further substitution by a chlorine atom or an alkyl or alkoxy group, have application in, for example, the insecticidal field. Among these compounds are 2:4-dichlorophenoxymethyl chloride, 3:4-dichlorophenoxymethyl chloride, 3-methyl 4-chlorophenoxymethyl chloride, 4-chlorphenylthiomethyl chloride.

The present invention is illustrated by the following examples in which the temperatures referred to are on the centigrade scale:

Example I 2.75 gms. of 2:4-dichlorophenoxymethane sodium sulphonate were ground in a dry mortar with 4.15 gms. of phosphorus pentachloride until reaction set in and the whole liquified completely. After standing for about ten minutes crushed ice was added to decompose the thionyl chloride and phosphorus chlorides. The required product quickly solidified. It was extracted with ether and the ethereal solution washed quickly with ice cold dilute caustic soda solution, in quantity just sufficient to give a permanent pink to phenolphthalein after vigorous shaking and then with ice cold water until neutral to litmus. The ether solution after drying and evaporating yielded the required 2:4-dichlorophenoxymethyl chloride in about 90% yield. It was purified by sublimation at 50–60°/0.05 mm. and/or by crystallisation from light petroleum. It had M. P. 53–54° (corr.) and had the following composition. C, 39.9; H, 2.49; Cl, 50.2; molecular weight, 207. The required figures for 2:4-dichlorophenoxymethyl chloride are C, 39.7; H, 2.46; Cl, 50.4; molecular weight, 211.5.

Example II

Finely powdered sodium 2:4-dichlorphenoxymethane sulphonate (49 g.) and phosphorus pentachloride (74 g.; 2.0 mol.) were ground together in a dry mortar, small quantities of each being added alternately during 15 minutes. After 10 minutes' continued grinding, the thin slurry was treated with crushed ice (ca. 400 g.) and the oily product which separated extracted into ether (400 cc.). The extract was washed twice with ice cold 2 N sodium hydroxide (100 cc.) and then twice with ice water (50 cc.). After drying over anhydrous sodium sulphate, evaporation of the ether left 27.4 g. (71%) 2:4-dichlorphenoxymethyl chloride. The product was purified by vacuum distillation, at 55–60°/0.2 mm. or by solution in 5 volumes of light petroleum (B. P. 40°–60°) from which it crystallised, after concentration to about 2 volumes, as long colourless needles, M. P. 53–54°.

4-methoxyphenoxymethyl chloride, B. P. 74–76°/0.08 mm. was prepared from the corresponding sodium sulphonate also by the above procedure.

Example III

Sodium 2:4-dichlorophenoxymethane sulphonate (55.8 g.) and phosphorus pentachloride (83.5 g.; 2 mol.) were suspended in dry ether (250 cc.) and boiled under reflux under anhydrous conditions for 3 hours. The mixture when cool was treated with ice and excess dilute sodium hydroxide solution. The ethereal solution was washed with ice-cold water and dried over anhydrous potassium carbonate. The solvent was removed and the residue dissolved in light petroleum (B. P. 40–60°). After treatment with decolourising charcoal and hot filtration, the filtrate, concentrated to 80 cc., was cooled in ice. The crystalline product was collected and dried in vacuo over silica gel to give 32.8 g. (78%) of 2:4-dichlorophenoxymethyl chloride, M. P. 54–55°. Dry benzene may be used in this preparation in place of ether.

Example IV

The procedure of Example 2 was followed except that the barium salt was substituted for the sodium salt of 2:4-dichlorphenoxymethane sulphonate. Reaction was slower than with the sodium salt and the reaction product was a viscous suspension rather than a fluid slurry. The reaction product was allowed to stand for 15 minutes, with occasional stirring before addition of the ice. It was necessary to filter off small quantities of barium phosphate both before and after washing with the 2 N sodium hydroxide. Anhydrous potassium carbonate was used to dry the ether solution of product, in place of sodium sulphate. The yield of 2:4-dichlorphenoxymethyl chloride was 79% crude and 60% after crystallisation from light petroleum (B. P. 40°–60°).

2-chlorphenoxymethyl chloride, B. P. 113–115°/11 mm. was obtained from the corresponding barium sulphonate also by the above procedure.

Example V

The procedure of Example 3 was repeated using barium 2:4-dichlorphenoxymethane sulphonate in place of the sodium salt. The reaction mixture was stirred mechanically. It was necessary to filter off small quantities of barium phosphate which separated during processing the reaction product. The yield of 2:4-dichlorphenoxymethyl chloride was similar to that obtained in Example 3.

Example VI

A suspension of finely powdered barium 2:4-dichlorphenoxymethane sulphonate (6.5 g.) in phosphorus oxychloride (33.0 cc.) was heated under reflux for 1.5 hours. The excess phosphorus oxychloride was removed under reduced pressure and the residue treated with crushed ice and ether. The ethereal layer was washed with ice-cold 2 N sodium hydroxide and then twice with ice water. On removal of the ether and drying over anhydrous potassium carbonate, a 94% yield of crude 2:4-dichlorphenoxymethyl chloride was obtained.

2:5-dichlorphenoxymethyl chloride, M. P. 45–46°, was prepared by the above method from barium 2:5-dichlorphenoxymethane sulphonate, reaction with the phosphorus oxychloride being continued for 3 hours and 2 N sodium carbonate being used in place of 2 N sodium hydroxide for washing the ethereal solution of product. With these latter modifications, the above procedure was used to prepare both 2:4:5-trichlorphenoxymethyl chloride, M. P. 83–84° and 2:4:6-trichlorphenoxymethyl chloride, M. P. 34–35°, B. P. 80–90°/0.1 mm. from the corresponding barium sulphonates.

Example VII

A solution of barium 2:4-dichlorophenoxymethane sulphonate (13.0 g.) in boiling water (300 cc.) was treated with 2 N sulphuric acid (19 cc.; 0.95 equiv.) and the precipitated barium sulphate removed by filtration. The filtrate was evaporated to dryness. The residual free sulphonic acid dissolved rapidly when cold thionyl chloride (32 cc.) was added. The solution was heated under reflux for 1 hour, after which the thionyl chloride was removed finally under reduced pressure. The residue was treated with crushed ice and extracted with ether. The extract was washed first with N sodium hydroxide and then water, and dried over anhydrous potassium carbonate. Removal of the ether left 2:4-dichlorophenoxymethyl chloride in 90% yield.

Example VIII 4-chlorphenoxymethyl chloride was prepared from the corresponding sodium sulphonate by the method of Example 2, except that 2 N sodium carbonate was used in place of 2 N sodium hydroxide in washing the ethereal solution of crude product. It was purified by sublimation at 35–45°/0.02 mm. pressure to give faintly pink needles, M. P. 27.5–30°.

Example IX 4-cyanophenoxymethyl chloride was prepared from the corresponding sodium sulphonate by the method of Example 3, using benzene as solvent. The product boiled at 90°/0.05 mm. and solidified to a pale amber solid M. P. 36–37°.

4-chlorophenoxymethylchloride was prepared similarly, the product (75% yield) boiling at 54–55°/0.1 mm.

Example X

Phosphorus pentabromide was substituted for phosphorus pentachloride in the reaction described in Example 3. The product, 2:4-dichlorphenoxymethylbromide, was purified by sublimation at 60°/0.1 mm. as colourless needles, M. P. 52–53°, becoming brown in contact with air.

Example XI

A mixture of barium phenoxymethane sulphonate (25.6 g.) and phosphorus oxychloride (68 cc.) was refluxed for four hours. The excess phosphorus oxychloride was distilled off under reduced pressure and the residue treated with ether and poured onto ice. The ethereal layer was separated, washed with ice-cold N.sodium hydroxide, twice with ice-cold water, and dried over anhydrous potassium carbonate. After removal of ether the residue was distilled under reduced pressure, giving phenoxymethyl chloride, B. P. 78°/10 mm.

Example XII

2:6-dichlorphenoxymethyl chloride was prepared by the method of Example XI and distilled as a colourless liquid at 0.1 mm.

Example XIII

A mixture of sodium 3-methyl-4-chlorophenoxymethane sulphonate (12.9 g.), phosphorus pentachloride (21.1 g.) and dry ether (50 cc.) was refluxed for four hours and the reaction mixture treated in accordance with Example 3. 3-methyl-4-chlorophenoxymethyl chloride, B. P. 116–118°/9 mm. was obtained in 69% yield.

Example XIV

A mixture of barium 3:5-dimethyl-4-chlorophenoxymethane sulphonate (9.34 g.) and phosphorus oxychloride (41 cc.) was treated in accordance with Example XI except that the crude product was crystallised from light petroleum (60 cc.; B. P. 40–60°) giving 3:5-dimethyl-4-chlorophenoxymethyl chloride, M. P. 69.5–70.0° in 67% yield.

Example XV

A mixture of sodium β-naphthoxymethane sulphonate (13.0 g.), phosphorus pentachloride (21.0 g.) and dry ether (50 cc.) was submitted to the procedure of Example 3, giving β-naphthoxymethyl chloride, B. P. 90–110°/0.15 mm., M. P. 39–41°, in 70% yield.

Example XVI

Barium phenylene-1:4-bis(oxymethane sulphonate) (13.54 g.) was dissolved in boiling water and 2 N sulphuric acid (28.0 cc.) added. The mixture was filtered and the filtrate evaporated to dryness on the steam-bath under reduced pressure and the residue dried by azeotropic distillation with benzene.

The mass of phenylene 1:4-bis(oxymethane sulphonic acid) was broken up and suspended in dry ether (50 cc.). Phosphorus pentachloride (25.2 g.) was added during 20 minutes at 0° and the mixture refluxed on the steam-bath for thirty minutes. A further 12.6 g. phosphorus pentachloride and 50 cc. ether were added and the mixture refluxed for a further thirty minutes. The procedure of Example 3 gave a product which crystallised from light petroleum (75 cc.; B. P. 60–80°) giving phenylene-1:4-bis(oxymethyl chloride), M. P. 91.5–94.5° in 48% yield.

Example XVII

A mixture of sodium 4-methylphenylthiomethane sulphonate (11.0 g.) and phosphorus pentachloride (19.2 g.) was ground until completely reacted. The mixture was then submitted to the procedure of Example 2. The product distilled under reduced pressure, giving 4-methylphenylthiomethyl chloride, B. P. 126–129°/15 mm. in almost quantitative yield.

Example XVIII

Finely powdered sodium-4-nitrophenoxy methane sulphonate hydrate (5 g.) and phosphorus pentachloride (8.9 g.; 2.7 mol.) were ground together for 10 minutes, and worked up as in Example 2, except that anhydrous calcium chloride was used to dry the ethereal solution. The product, 4-nitrophenoxy methyl chloride was purified by crystallisation from 10 volumes of light petroleum (B. P. 60–80°) and obtained as long yellow prisms, M. P. 35–36°.

Example XIX

Finely powdered sodium 4:6-dichlorophenylene-1:3-bis(thiomethane sulphonate) (4.43 g.), phosphorus pentachloride (12.5 g.) and phosphorus oxychloride (9 cc.) were mixed together, heated under reflux for two hours, then worked up as in Example 2. The product, 4:6-dichlorophenylene - 1:3 - bis(thiomethyl chloride), was purified by crystallisation from 25 cc. light petroleum (B. P. 60–80°) and was obtained as colourless needles, M. P. 87.5–88.5°.

I claim:

1. A process for producing aryloxymethyl halide which comprises reacting a member of the class consisting of aryloxymethane sulphonic acids and their salts with a member of the class consisting of phosphorus pentachloride, pentabromide, oxychloride and oxybromide and thionyl chloride and bromide.

2. A process for producing an aryloxymethyl halide which comprises reacting a salt of a nuclear-halogenated aryloxymethane sulphonic acid with a member of the class consisting of phosphorus pentachloride, pentabromide, oxychloride and oxybromide and thionyl chloride and bromide.

3. A process for producing an aryloxymethyl halide which comprises reacting a nuclear-halogenated aryloxymethane sulphonic acid with a member of the class consisting of phosphorus pentachloride, pentabromide, oxychloride and oxybromide and thionyl chloride and bromide.

4. A process for the production of 2:4-dichlorophenoxymethyl chloride which comprises reacting a salt of 2:4-dichlorophenoxymethane sulphonic acid with phosphorus pentachloride.

5. A process for the production of 2:4-dichlorophenoxymethyl chloride which comprises reacting the sodium salt of 2:4-dichlorophenoxymethane sulphonic acid with a member of the class consisting of phosphorus pentachloride, pentabromide, oxychloride and oxybromide, and thionyl chloride and bromide.

6. A process for the production of 2:4-dichlorophenoxymethyl chloride which comprises reacting the sodium salt of 2:4-dichlorophenoxymethane sulphonic acid with phosphorus pentachloride.

7. A process for the production of 4-methoxyphenoxymethyl chloride which comprises reacting a salt of 4-methoxyphenoxymethane sulphonic acid with phosphorus pentachloride.

8. A process for the production of 3:5-dimethyl-4-chlorophenoxymethyl chloride which comprises reacting a salt of 3:5-dimethyl-4-chlorphenoxymethane sulphonic acid with phosphorus pentachloride.

9. A process for producing a para-chlorphenoxymethyl halide substituted by a member of the class consisting of halogen and alkyl which comprises reacting a para-chlorphenoxymethane sulphonate nuclearly-substituted by a member of the class consisting of halogen and alkyl with a member of the class consisting of phosphorus pentachloride, pentabromide, oxychloride and oxybromide, and thionyl chloride and bromide.

10. A process for the production of 2-chlorophenoxymethyl chloride which comprises reacting a salt of 2-chlorophenoxymethane sulphonic acid with phosphorus pentachloride.

HARRY JAMES BARBER.

References Cited in the file of this patent

UNITED STATES PATENTS

| Number | Name | Date |
| --- | --- | --- |
| 2,108,606 | Mueller et al. | Feb. 15, 1938 |
| 2,165,813 | Prutton | July 11, 1939 |
| 2,186,367 | Coleman et al. | Jan. 9, 1940 |
| 2,281,677 | Craig et al. | May 5, 1942 |
| 2,407,292 | Salzberg | Sept. 10, 1946 |
| 2,569,423 | Luskin | Sept. 25, 1951 |

FOREIGN PATENTS

| Number | Country | Date |
| --- | --- | --- |
| 647,215 | Great Britain | Dec. 6, 1950 |

OTHER REFERENCES

Kirchner: J. Amer. Chem. Soc., vol. 48, page 2747 (1926).

Weygand: Chem. Zentralblatt, page 3053, II, 1941.

Bohme et al.: "Ann. der Chemie," Band 563, Heft 1/2, pages 54–55 and 64, May 5, 1949.